United States Patent [19]

Redfern

[11] 4,144,530
[45] Mar. 13, 1979

[54] COMBINED INTRUSION SENSOR LINE
[75] Inventor: John T. Redfern, La Jolla, Calif.
[73] Assignee: The United States of America as represented by the Secretary of the Navy, Washington, D.C.
[21] Appl. No.: 852,265
[22] Filed: Nov. 17, 1977
[51] Int. Cl.² ............................................. G08B 13/22
[52] U.S. Cl. .................................. 340/566; 174/70 R; 250/199; 340/505; 340/524; 340/531; 350/96.23
[58] Field of Search ............... 340/566, 531, 505, 524; 250/199; 350/96.23; 174/70 R, 70 S

[56] References Cited
U.S. PATENT DOCUMENTS

| | | | |
|---|---|---|---|
| 3,401,469 | 9/1968 | Shaver et al. | 174/70 R |
| 3,660,590 | 5/1972 | Conant | 174/70 R |
| 3,806,908 | 4/1974 | Bound et al. | 340/566 |
| 3,833,897 | 9/1974 | Bell et al. | 340/566 |

FOREIGN PATENT DOCUMENTS 1172272  11/1969  United Kingdom .................. 350/96.23

Primary Examiner—Glen R. Swann, III
Attorney, Agent, or Firm—Richard S. Sciascia; Ervin F. Johnston; Thomas G. Keough

[57] ABSTRACT

A single composite cable is deployed between adjacent monitoring stations for sensing an intruder. A number of piezoelectric elements disposed in the cable provide electrical intrusion signals when they are disturbed. Power and triggering pulses for the stations are fed through the cable by a pair of electrical conductors and optical signals representative of the intrusion signals are fed through at least one optical fiber. As a result, the composite cable is relatively lightweight and compact to simplify deployment and it avoids the problems normally associated with crosstalk.

5 Claims, 2 Drawing Figures

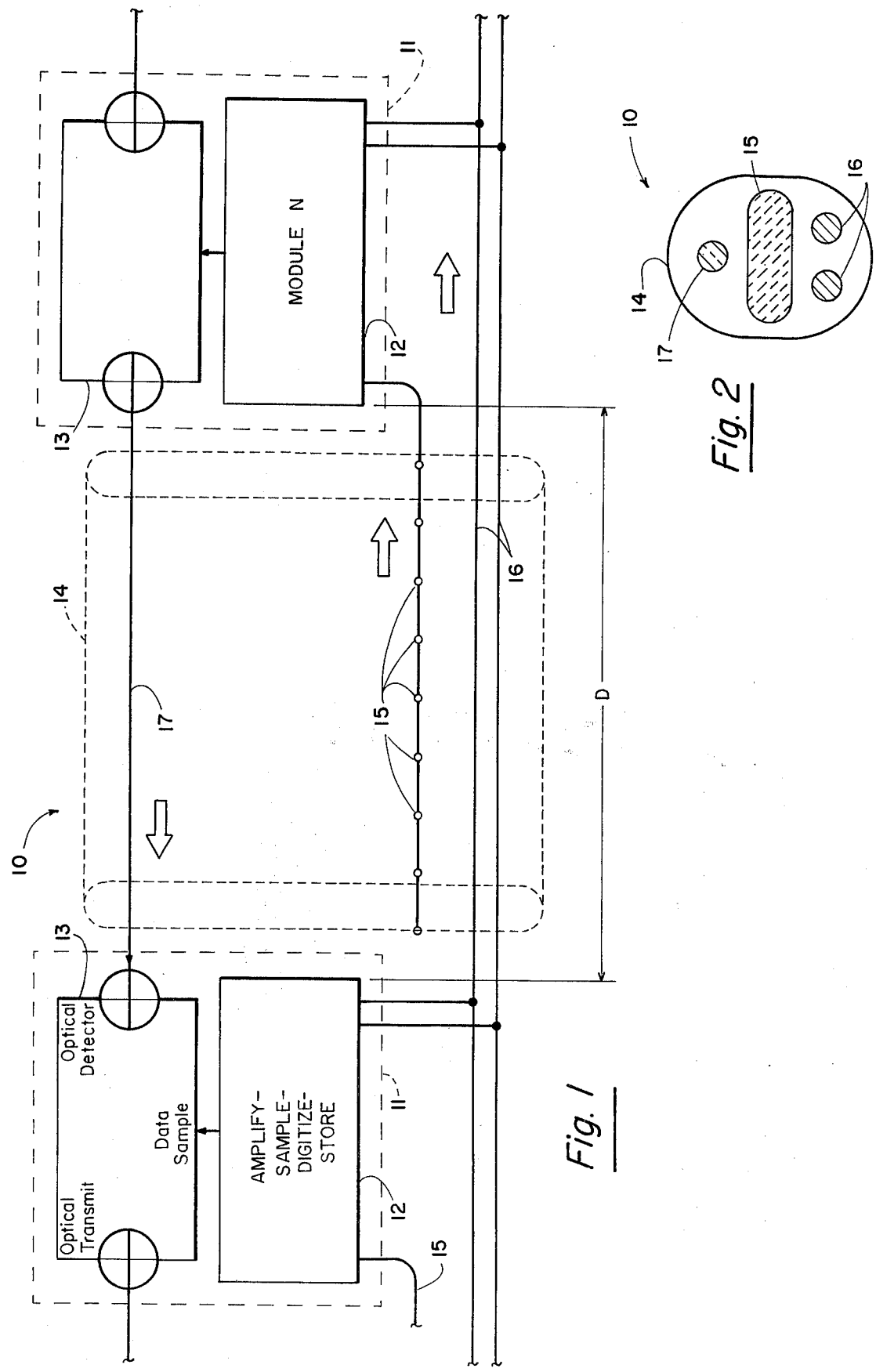

COMBINED INTRUSION SENSOR LINE

STATEMENT OF GOVERNMENT INTEREST

The invention described herein may be manufactured and used by or for the government of the United States of America for governmental purposes without the payment of any royalties thereon or therefor.

BACKGROUND OF THE INVENTION

The threats of sabotage or acts of terrorism make plants, storage yards, etc. vulnerable. Security forces long have relied upon patrols or some sort of a beam interrupter or doppler apparatus for sensing an intrusion into an area. While these provide a degree of security, a family of more sophisticated and reliable approaches has been developed. All rely on the deployment of an elongate, hose-like structure which has a number of vibration sensitive devices located along its length. A noteworthy example of a system of this type is disclosed in U.S. Pat. No. 3,806,908 issued to Lloyd R. Bound on Apr. 23, 1974. The system uses a number of piezoelectric transducers and wires contained in or connected to a buried cable. Another pair of interesting approaches is disclosed in the U.S. Pat. No. 3,832,704 issued to Vahram S. Kardashian on Aug. 27, 1974 and the U.S. Pat. No. 3,882,441 issued to James O. Holmen et al on May 6, 1975. Both rely on the interaction of magnetostrictive film plated wires to sense external disturbances and the location of a possible intruder. Still another intrusion detection system was designed by Robert F. Bell et al and patented on Sept. 3, 1974 in U.S. Pat. No. 3,833,897. A coaxial electric cable converts mechanical vibrations to representative signals capable of being monitored at a remote station. The signals generated are distinctive sounds made by an intruder either climbing or cutting through a chain link fence. Provision is made for a loudspeaker or an alarm generator to indicate where an intrusion has occurred.

All of the aforeidentified detection systems represent meritorious advances in the state of the art; however, questions arise as to their reliability. Since all rely on metallic conductors powering the system and for returning information to a monitor, the problems associated with signal-to-noise ratios and crosstalk must be considered. Using coaxial cables is not the complete solution, since their bulk, expense and susceptibility to damage precludes their use in a vast number of situations.

Cables have been designed which combine the transmission of optical and conventional electrical power. An example of such a conduit is described in U.S. Pat. No. 3,660,590 issued to James E. Conant on May 2, 1972. The patent discloses fiber-optic as well as metallic conductors wrapped together to enclose a passageway for liquids. While this conduit is unique for its envisioned use and eliminates cross-talk problems while giving a hydraulic communication capability, it cannot detect an intrusion.

Thus, there is a continuing need in the state-of-the-art for an intrusion sensor line which advantageously employs the concept of combining sensors, fiber-optics and electrical power conductors for reducing the problems associated with signal-to-noise degradation and crosstalk while presenting a compact, easily deployable unit.

SUMMARY OF THE INVENTION

The present invention is directed to providing an apparatus for sensing mechanical vibrations representative of an intruder and feeding representative signals between signal processing modules. A means generates electrical signals in response to mechanical vibrations caused by an intruder and an electrical power and electrical timing pulse means disposed adjacent to the generating means are coupled to the signal processing modules. An optical signal transmitting means is disposed adjacent the generating means and the electrical power and timing pulse providing means for sending optical data to a remote monitoring station. All three of the aforedescribed means are contained within an encasing means which protects and allows the relatively trouble-free deployment thereof.

An object of the invention is to provide an improved intrusion sensing device.

Another object is to provide an intrusion sensor having the sensing device, electrical power supply and the data transmitting link contained within a single conduit.

Yet another object is to provide an arrangement by which the problems associated with cross-talk are largely avoided.

Another object is to provide an intrusion device incorporating mutually cooperating sensors, wires, and fiber-optics to assure more reliable detection of an intruder.

Still another object is to provide an improved intrusion detector more easily deployable by reason of the combined sensing, power and data transmission links.

These and other objects of the invention will become more readily apparent from the ensuing specification when taken with the drawings.

BRIEF DESCRIPTION OF THE DRAWINGS

FIG. 1 is a schematical representation of the system of the invention.

FIG. 2 shows a cross-sectional representation of the invention.

DESCRIPTION OF THE PREFERRED EMBODIMENT

Referring now to the drawings, a representative embodiment of a length D of a composite cable 10 is schematically shown as extending between two stations 11 in an intrusion monitoring system. A number of stations are serially connected and terminate at a monitor. The lengths of composite cable usually are arranged to encircle an installation but can be strung out in any of a variety of configurations to detect the mechanical vibrations of an intruder.

Each of the stations is provided with a digitizing module 12 which digitizes analog signals coming from the composite cable. The digitizing module includes an amplifying stage, analog-to-digital stage and storage stage. These stages and their interconnection are well established in the state-of-the-art and further elaboration is felt to be unnecessary, particularly since they are not considered to be part of the claimed invention. An optical module 13 is operatively interconnected with each digitizing module to convert digitized pulse trains into representative light signals. Fabrication of this module also is well within the state-of-the-art and is not part of the claimed invention.

Composite cable 10 is a unitary design contained within a common outer tube 14. The tube is much like the outer tube on a conventional coaxial cable or, preferably, is made from a more flexible sheath material to enable storage on a reel and to ease deployment.

Within the tube, a number of pressure detectors 15 are connected to extend the length between adjacent stations. The pressure detectors optionally are piezoelectric transducers similar to those disclosed in U.S. Pat. No. 3,806,908. Any of a number of detectors can be substituted in keeping with the teachings of this invention, however, the one chosen should possess the characteristics of producing responsive analog signals when it is subjected to a varying pressure or mechanical vibrations.

Electrical power comes from the remote monitor to the number of stations 11 via a pair of copper wires 16. The wires also feed synchronizing or timing pulses in selective time frames to the several stations. When a predetermined number of pulses reaches a particular station N, then station N interrogates its storage stage. If there are any stored digitized signals representative of electrical analog signals generated by the pressure detector 15, then optical signals are generated in module 13 and transmitted via an optical fiber 17.

At least one fiber optic element 17 is contained in composite cable 10 and is coupled between the optical modules of each station. The fiber optics communicate light pulses back to the central monitor and by so doing, give an indication of the presence of an intruder within a given distance D of the composite cable. The pressure detectors, wires and fiber optics are held in the tube by dielectric spacers or the tube is dielectric filled.

In operation, pressure detectors 15 in the length D of the composite cable provide analog signals when disturbed by an intruder. The composite cable usually is buried a short distance beneath the surface of the ground to provide the desired sensitivity.

Referring more specifically to FIG. 1, on copper wires 16 electrical power and timing pulses are fed to actuate the amplifying, sampling, digitizing and storing circuitry of module N within a preestablished time frame. After the analog signals emanating from the pressure detectors have been digitized, they are stored until the proper time frame interrogation pulse reaches the module via the wires 16. At this precise time the module 12 passes the digitized stored signals to the optical module 13 where the digitized information is converted to optical impulses. The optical signals are then transmitted in the fiber optics 17 to adjacent stations where they are repeated and delivered to a central monitor. At the central monitor the length of the composite cable is determined by noting which time frame the representative optical signals are received. In other words, by assigning a different time frame to a number of stations, the location of an intrusion is determined. If there are ten time frames within a cycle of interest and each time frame represents one-tenth of the distance around a perimeter, the information appearing in any one of the different time frames represents where along the perimeter an intrusion has occurred.

Obviously, many modifications and variations of the present invention are possible in light of the above teachings, and, it is therefore understood that the invention may be practiced otherwise than as specifically described.

What is claimed is:

1. An apparatus for sensing mechanical vibrations representative of an intruder and feeding representative signals between signal processing modules;
   means for generating electrical signals in response to the mechanical vibrations caused by the intruder;
   means disposed adjacent the generating means for providing electrical power and electrical timing pulses to the signal processing modules;
   means disposed adjacent the generating means and the electrical power and timing pulse providing means for transmitting optical signals representative of the generated electrical signals; and
   means disposed about the generating means, the electrical power providing means and the optical signal transmitting means for encasing them.

2. An apparatus according to claim 1 in which the generating means is a number of piezoelectric elements coupled together in a line.

3. An apparatus according to claim 2 in which the providing means is at least one wire.

4. An apparatus according to claim 3 in which the transmitting means is at least one optical fiber.

5. An apparatus according to claim 4 in which the encasing means is a common tube.

* * * * *